Aug. 12, 1958     J. ELLIOTT     2,846,804
AUTOMATIC LINE RELEASE FOR USE ON FISHING RODS
Filed Oct. 23, 1956
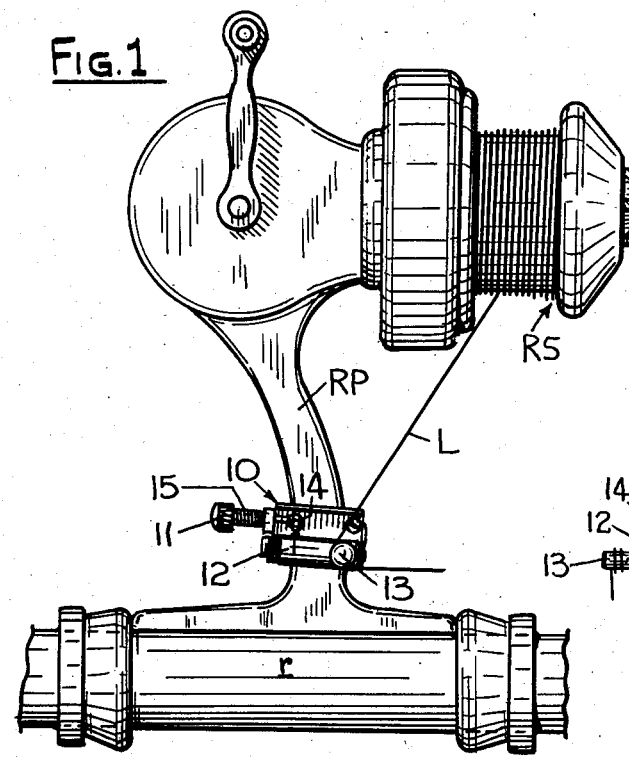
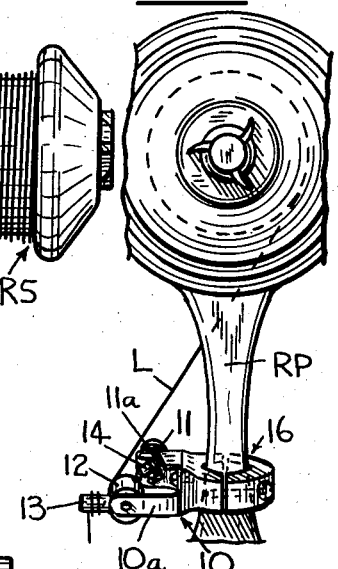
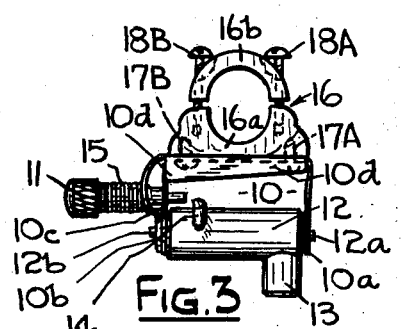
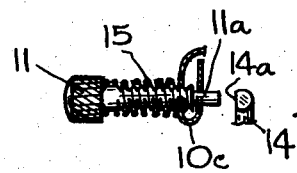
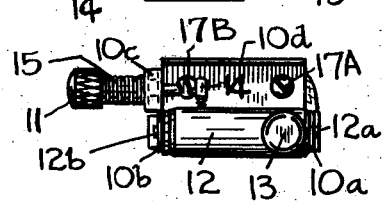
INVENTOR
JOSEPH ELLIOTT,
BY
*Gustan H. Emery*
ATTORNEY

United States Patent Office 2,846,804
Patented Aug. 12, 1958

2,846,804

AUTOMATIC LINE RELEASE FOR USE ON FISHING RODS

Joseph Elliott, Inglewood, New Zealand

Application October 23, 1956, Serial No. 617,798

8 Claims. (Cl. 43—25)

This invention is concerned with an automatic line release device for use on a fishing rod, more particularly a rod of the surf-casting type.

In surf-casting, the desire is to get the line as far out to sea as possible from a shore base. A long heavy rod is used and a sinker of some 3 oz. in weight. The rod is rotated powerfully in a forward overhead arc, the nylon line being held by a forefinger near the reel, and released at a critical instant to give maximum distance.

However, this seldom works out exactly in practice—with beginners especially—while the wear and tear on the forefinger is, it is understood, severe.

It is the object of this invention to provide an automatic line release device for use on a fishing rod, particularly one of the surf-casting type, as an effort to overcome such shortcoming.

According hereto the invention generally covers an automatic line release device for use on a fishing rod such as one used in surf-casting, such device comprising a mount for detachably clamping to a fixed part such as the stem of a reel of the rod, a base detachably secured to the mount, a rotor or barrel journalled in the base to be capable of rotation and having a projection pin, a roller journalled or a stud fixed on the rotor or barrel around which the fishing line is designed to pass and an adjusting screw threaded through part of base for an inner end of the screw to normally be across the rotative line of the pin on the rotor or barrel, the construction and arrangement being such that in a casting action of the rod the pin will slide on the screw and when freed of the screw's end, the roller or stud will rotate to release the line.

Such device is designed as a small unit which can be readily clamped to the pillar or stem of an existing type of reel of the fixed spool type. In this type, the spool itself does not normally turn as the line pays out; the line merely pulls off the spool endways.

In further describing the invention, reference will be made hereinafter to the accompanying drawing, in which:

Figure 1 is a side view of a reel with the release device attached to the stem of the reel and Figure 2 is an end view thereof;

Figure 3 is a plan of the device on a slightly larger scale,

Figure 4 is a side view and

Figure 5 is an end view thereof;

Figure 6 is a detailed section of the adjusting screw and its relative parts.

In the preferred form of the invention as shown, the base 10 is in the nature of a piece of thin high carbon steel plate which is cut out and shaped so that two extended lugs 10a, 10b form a wide U; another portion bent up and doubled on itself forms a support 10c for the adjusting screw 11; a third portion is bent as a flange 10d to give the base rigidity. The lugs 10a, 10b, are tempered.

The rotor or barrel 12 is a round solid piece of metal shaped to form a short shaft 12a, 12b, at each end journalled in the lug supports 10a, 10b. The stud 13 is mounted on the barrel 12 at one end at a different radial position to the pin 14. Although not shown in the drawings, the stud can be replaced by a pin and a grooved roller mounted thereon. The hardened pin 14 projects from the side of the barrel 12 near the opposite end, with the end of the pin shaped with a flat surface 14a (see drawing Figure 6). The adjusting screw 11 has a plain end 11a by the thread near its end being turned off and a spring 15 is set in compression between the head of the screw and the support 10c on the screw being passed through. The barrel assembly is snapped into place for its shafts 12a, 12b, to be journalled in holes in the lug supports 10a, 10b and is free to rotate except when blocked by the end 11a of the adjustable hardened screw 11, which when turned a certain distance inward enters the line of rotation of the hardened pin 14. The base 10 in turn is screwed to the suitable aluminum mount, 16, by screws, 17a, 17b passed through the base 10. The mount 16 consists of two annular like halves 16a, 16b which are separably connected by means of screws 18A, 18B passed through holes in the outer half and screwing into tapped holes in the inner half. The completed device may then be clamped to the reel stem RP by tightening the screws 18A, 18B.

Whilst the device has been described in a de-mountable form, it will be appreciated that it could be made integral and a permanent fitting on a reel or its pillar.

The action of the release device is as follows: When making a cast, the line L instead of being held by the forefinger is drawn back slightly and looped around the stud 13, the weight of a dangling sinker at the end of the line maintaining it in position. The reel spool RS is locked, and the cast is then made in the normal manner. As the apparent weight of a sinker increases due to centrifugal force, there are two forces acting on the release device, one tending to pull the barrel 12 forward along the axis of the rod $r$ against the opposition of the tempered base spring support 10a and a much lesser force tending to rotate the barrel 12 inwards towards the reel pillar RP. This force is, in turn, opposed by the pin 14, which moves forward slightly with the barrel due to the spring in the supports, along the plain end 11a of the adjustment screw 11 until it finally reaches the extremity of the screw. The pin instantly clears such extremity by its flat 11a, and the barrel spins inward i. e., towards the base, on its shafts 12a, 12b to release the line L. If this takes place at the right instant i. e. approximately 45° before the vertical position of the rod tip, a perfect trajectory is attained. It will be readily apparent that the moment of release hinges mainly on two factors: the amount of force exerted by the operator and the position of the adjustment screw 11. This screw has necessarily a very short range and a fraction of a turn will make a big difference to its setting relative to the pin 14; tension must be set correctly first for a proper functioning of the release device.

If more strength is used in rotating the rod then, with the same adjustment, the release will be sooner, and a high trajectory will result. Alternatively if the same force is exerted, but the adjustment screw 11 is screwed further in, a flat trajectory results as the rod must swing farther before sufficient poundage is gained for release. In practice it has been found that the poundage required with an average man making a normal cast is in the region between 7 and 10 lbs., as measured by a spring balance. In practice, too, the release device is surprisingly consistent and casts of considerable distance (80 to 100 yards and more) can be made repeatedly.

Having now described my invention, what I claim is:

1. An automatic line release device for use on a fishing rod comprising a mount for detachably clamping to a fixed part, a base detachably secured to the mount, a rotor shaft journalled in the base to be capable of rotation and having a projecting pin thereon, a stud fixed on the rotor shaft around which a fishing line is adapted to pass and an adjusting screw threaded through a part of the base for an inner end of the screw to normally be across the rotative path of the pin on the shaft to prevent rotation of the shaft when the pin and the screw are in contact, the casting action of the rod sliding the pin along the screw and when the pin is freed from the end of the screw the line releases from the stud upon rotation of the shaft.

2. An automatic line release device according to claim 1, in which the base has a wide U-shape with the bottom thereof attached by screws to the mount and the rotor shaft is journalled in the ends of the sides thereof.

3. An automatic line release device according to claim 1, in which the rotor shaft is a round metal piece, the pin projecting near one end of the rotor shaft, and the stud projects near the other end of the rotor shaft at a different radial position.

4. An automatic line release device according to claim 1, in which the end of the pin is shaped with a flat part and the end of the screw is plain.

5. An automatic line release device according to claim 2, in which the screw passes through a side of the U-shaped base near the end of the rotor shaft from which the pin projects.

6. An automatic line release device according to claim 1, in which a spring is provided set under compression on the screw between the base and a head of the screw.

7. An automatic line release device according to claim 1, in which the mount consists of two annular detachable halves separably connected by screws.

8. In a fishing rod of a surf-casting type, an automatic line release device comprising a mount for detachably clamping to a fixed part, a base detachably secured to the mount, a rotor journalled in the base to be capable of rotation and having a projecting pin, a stud fixed on the rotor around which the fishing line is designed to pass, and an adjusting screw threaded through part of the base for an inner end of the screw to normally cross the rotative path of the pin on the rotor to prevent rotation of the rotor when the pin and the screw are in contact whereby, in a casting action of the rod, the pin will slide along the screw and, when the pin is freed of the end of the screw, the line frees from the stud upon rotation of the rotor.

References Cited in the file of this patent

UNITED STATES PATENTS

| | | |
|---|---|---|
| 664,889 | Ogimura | Jan. 1, 1901 |
| 2,648,505 | Mauborgne | Aug. 11, 1953 |
| 2,761,237 | Piaja | Sept. 4, 1956 |
| 2,791,858 | Kernodle | May 14, 1957 |